3,044,001
MOTOR CONTROL CIRCUITS
Elmer A. Roller, Warren, Ohio, assignor to H. K. Porter Company, Inc., a corporation of Delaware
Filed Oct. 6, 1959, Ser. No. 844,763
4 Claims. (Cl. 318—221)

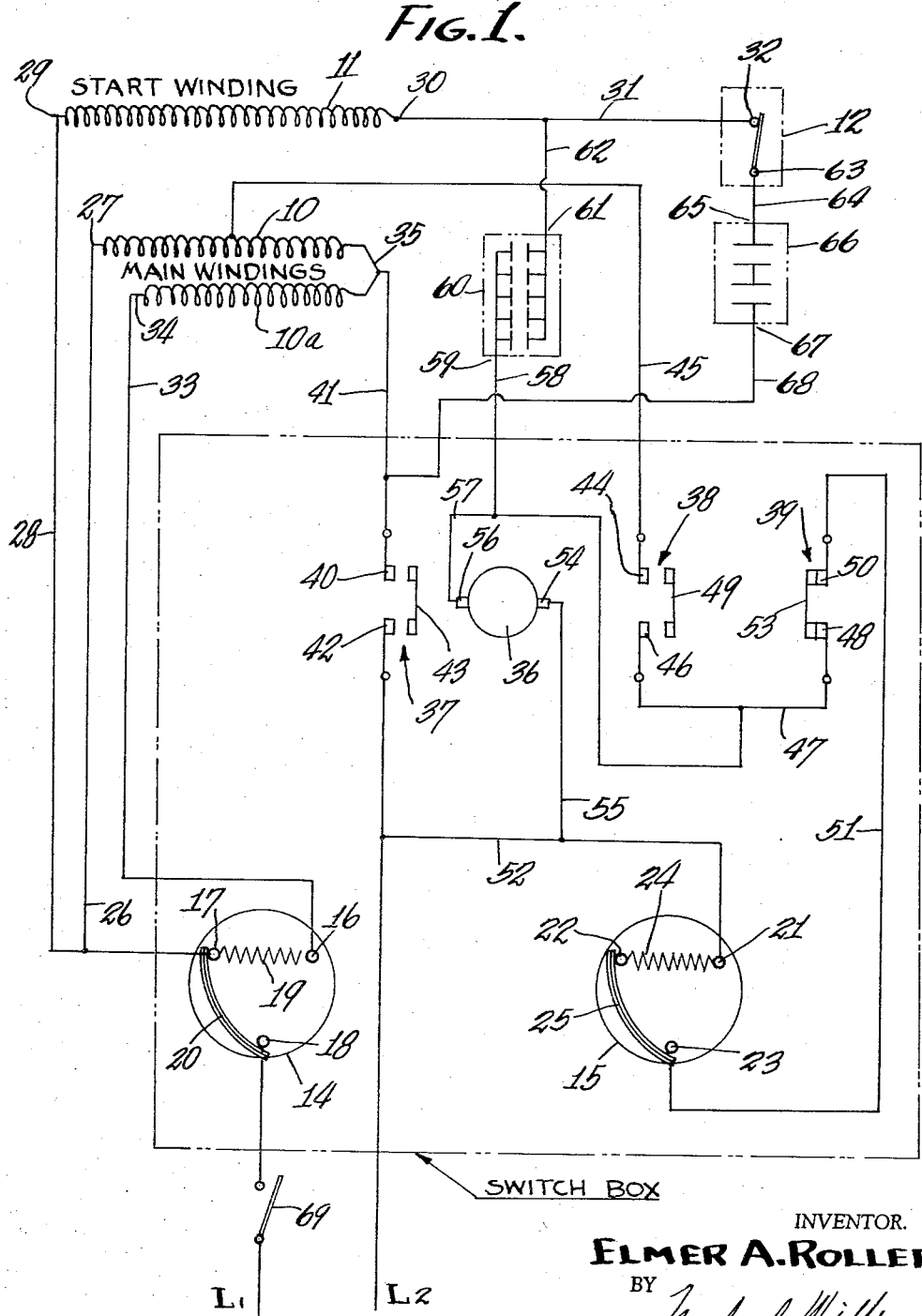

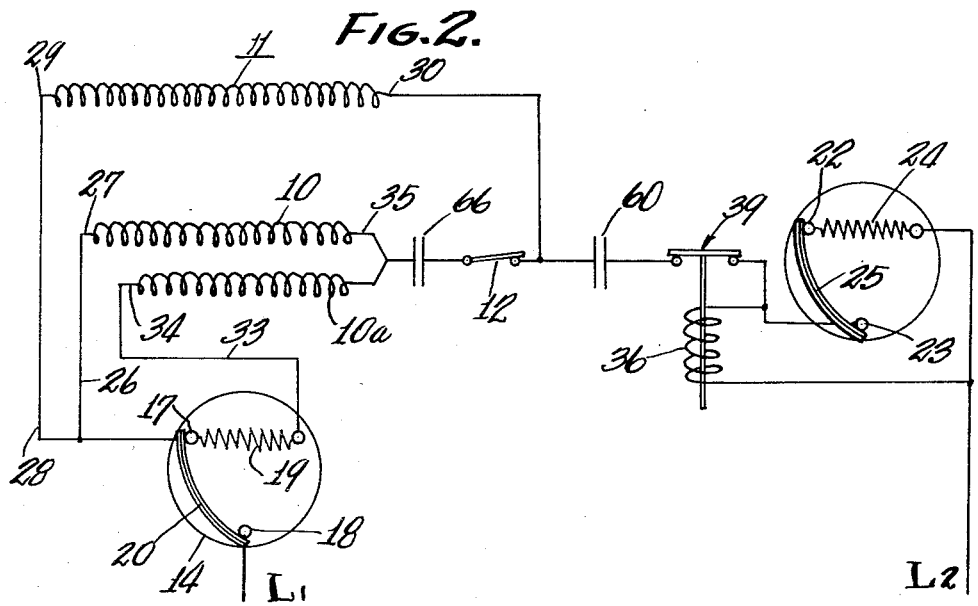
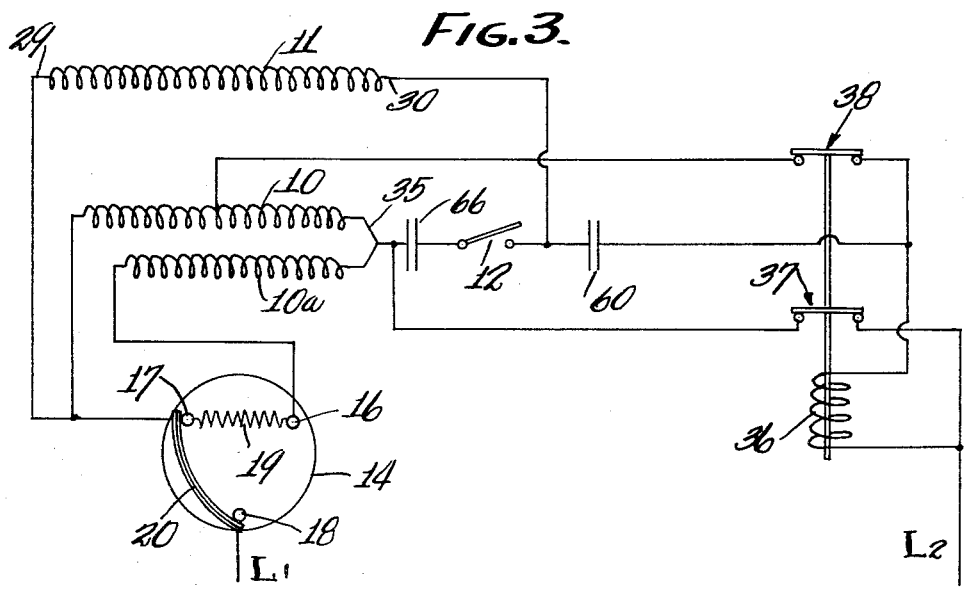
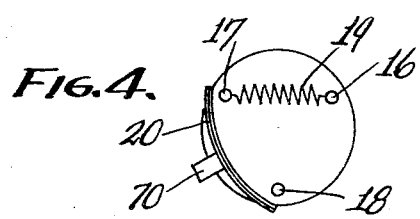
INVENTOR.
ELMER A. ROLLER
BY Michael Williams
ATTORNEY United States Patent Office 3,044,001
Patented July 10, 1962

My invention relates to control circuits for electric motors and the principal object of my invention is to provide new and improved circuits of this character.

My invention has particular applicability to power systems wherein certain of the devices in the system draw large amounts of power, as compared to other devices in the system, as for example, in a single phase power system which runs out to rural areas and which has mixed loads, such as home lighting, appliance operation and the like, as well as large electric motors of say 10 to 15 horsepower. Heretofore, the motors were largely controlled by manual reset magnetic starters which automatically moved to "off" position when a power failure in the power system existed. Thereafter, when the power in the system was restored, it was necessary to manually operate each motor starter to "on" position, a task which could consume considerable time.

Heretofore, if the large motors in the system noted above were controlled by manual reset starters and were left connected to the line, it was almost impossible to restore the power system because of the huge demand on the line made by the large horsepower motors, coupled with the demand of the low-power-requirement devices.

My invention overcomes the disadvantages of the prior art and permits the large horsepower motors, or the like to remain connected to the line, but connects the low-power-requirement devices and the high-power-requirement devices to the line at different times. More particularly, the high horsepower motors are connected to the line a predetermined period of time after the other devices have been connected and are operating.

My invention also provides means for removing the controlled devices, such as an electric motor, from the power system when certain conditions prevail, such as an overload of the motor and the like.

In the drawings accompanying this specification and forming a part of this application there is shown, for purpose of illustration, an embodiment which my invention may assume, and in these drawings:

FIGURE 1 is a circuit diagram illustrating a preferred embodiment of my invention, FIGURES 2 and 3 are diagrams illustrating the condition of the circuit when certain conditions prevail, and FIGURE 4 is a schematic illustration of a different type switch which may be used in my circuit.

My invention may be used for controlling any suitable electric motor, such as self-starting single-phase induction motor having a main running winding comprising the winding sections 10, 10a, and an auxiliary starting-winding 11, both of which are mounted on the primary member or stator (not shown) of the motor.

The motor is also provided with a rotor member (not shown) which has connection with a centrifugal switch 12 of any commercially available type. The switch 12 opens a circuit, as hereinafter disclosed, when the rotor has attained a predetermined speed.

The embodiment herein disclosed incorporates two thermally responsive switches 14 and 15 of any commercially available type, one preferred type being sold under the trademark "Klixon." The switches 14 and 15 may be similar in construction and in the present embodiment the switch 14 differs from the switch 15 only in the fact that it is designed to carry a heavier current capacity. The switch 14 provides an overload control and includes three terminals 16, 17 and 18. A heating resistance is connected between the terminals 16, 17 and a bimetallic switch member 20 normally bridges the terminals 17, 18. The member 20 is in heating realtion with the resistance 19 and will flex and break the electrical circuit between terminals 17, 18 when heat from the resistance reaches a predetermined amount. In turn, the heat from the resistance 19 is governed by the amount of current flowing therethrough, the greater the current, the greater the heat.

The switch 15, which provides a time-delay control, is like the switch 14 and has three terminals 21, 22 and 23. A heating resistance 24 connects the terminals 21, 22 and a bimetallic switch member 25 normally bridges the terminals 22, 23 but breaks the circuit between these terminals when subjected to a predetermined amount of heat from the resistance 24.

The control circuit of my invention is adapted to be connected to a suitable source of electrical energy, such as a 220 volt power line having conductors L1 and L2. As seen in FIGURE 1, the conductor L1 is connected to terminal 18 of switch 14. Terminal 17 of switch 14 is connected, by a conductor 26, to one end 27 of the main winding 10. The terminal 17 of the switch 14 is also connected, by conductor 28, to one end 29 of the start winding 11, the opposite end 30 of this winding being connected by conductor 31 to the terminal 32 of centrifugal switch 12. The terminal 16 of switch 14 is connected, by conductor 33, to one end 34 of main winding 10. Main windings 10, 10a have their ends opposite 27, 34 connected together as at 35.

A relay is incorporated in the preferred embodiment of my invention and this relay includes a coil 36 which cooperates with an armature to control switching contacts. In the present disclosure, the relay includes normally open contacts 37, 38 and normally closed contacts 39.

A terminal 40 of the normally open contacts 37 is connected, by conductor 41, to the connection 35 between the main windings 10, 10a, and the other terminal 42 of the contacts 37 is connected to line conductor L2. A switching member 43 is connected to the armature of the relay for bridging the terminals 40, 42 when the relay coil 36 is energized.

A terminal 44 of normally open contacts 38 is connected, by conductor 45, to an intermediate point of main winding 10, and the other terminal 46 of the contacts 38 is connected, by conductor 47, to a terminal 48 of normally closed contacts 39. A switching member 49 is connected to the armature of the relay for bridging the terminals 44, 46, when the relay coil is energized. The other terminal 50 of normally closed contacts 39 is connected, by conductor 51, to the terminal 23 of thermally responsive switch 15, and terminal 21 of this switch is connected, by conductor 52, to line wire L2. A switching member 53 is connected to the armature of the relay for bridging the terminals 48, 50 when the relay coil 36 is de-energized.

One end 54 of relay coil 36 is connected, by conductor 55, to conductor 52, and the other end 56 of relay coil 36 is connected, by conductor 57, to conductor 47. A conductor 58 extends between conductor 57 and one end 59 of a bank of oil capacitors 60, the other end 61 being connected, by conductor 62 to conductor 31. The terminal 63 of centrifugal switch 12 is connected by conductor 64, to one end 65 of a bank of electrolytic capacitors 66, the opposite end 67 being connected, by conductor 68, to conductor 41. The oil capacitors, as is well known, improve the running efficiency and power factor of the motor while the electrolytic capacitors provide the effect of a two phase motor in that they change the phase angle of the current in the start winding during the starting period of the motor.

The circuit in FIGURE 1 discloses the arrangement prior to the time a switch 69 interposed in main line L1 has been closed and therefore prior to the time the delay switch 15 is opened.

When the switch 69 is closed, current flow is established from line L1 to terminal 18, of switch 14 and through bimetallic member 20 and resistor 19 to terminals 17 and 16 respectively. From terminal 17, current will flow through conductor 28 to and through start winding 11, through conductor 62, oil capacitors 60, conductor 58, conductor 57, conductor 47, through normally closed contacts 39, conductor 51, bimetallic member 25, resistor 24, conductor 52 and back to line L2.

Current will also flow from terminals 17 and 16 of protective switch 14, respectively through conductors 26 and 33 to and through main windings 10 and 10a. From the common connection 35 of the main windings, current will flow through conductors 41 and 68 to and through electrolytic capacitors 66, through centrifugal switch 12 which is closed, conductors 31 and 62 to and through oil capacitors 60, conductors 58, 47, through normally closed contacts 39, then conductor 51, terminal 23 of time-delay switch 15, bimetallic member 25, resistor 24, conductor 52 and back to line L2.

Pertinent parts of the circuit, when the line switch 69 has been closed, are shown in FIGURE 2. Because of the character of the circuit and its components, about 70 volts will be impressed on the start and main windings and this is insufficient to start revolution of the motor rotor. About 150 volts will be impressed on the circuit from the start and main windings through the oil capacitors 60, normally closed contacts 39 and time-delay switch 15 and this causes resistor 24 to heat. Relay coil 36 is shorted out by bimetallic member 25, as seen in FIGURE 2, and therefore will not be energized.

After a suitable interval (which is dependent upon the amount of heat required from resistor 24 to flex bimetallic member 25) the circuit between terminals 22 and 23 will be broken by the flexing of the bimetallic member 25, whereupon the relay coil 36 is now energized instead of being shorted out, as before.

Energization of relay coil 36 causes contacts 39 to open and contacts 37 and 38 to close, and the pertinent parts of the circuit in this condition as shown in FIGURE 3. Immediately after relay coil 36 has been energized to open contacts 39, the bimetallic member 25 will cool and in time will again bridge terminals 22, 23. However, nothing will happen in this respect because contacts 39 are open. As shown in FIGURE 3, start winding 11 is energized by current flowing from conductor 62, centrifugal switch 12 which is still closed (although shown open in FIGURE 3) electrolytic capacitors 66, through closed contacts 37 and to line L2.

The main windings 10 and 10a are also energized by current flowing through conductors 26, 33 to and through the windings 10, 10a to common connection 35, through conductor 41, closed contacts 37 and back to line L2. The motor rotor will now start to rotate and when it reaches proper speed, centrifugal switch 12 will open and automatically leave the start winding 11 in series with the oil capacitors 60 across one half of main winding 10.

The operation of the motor is now under control of the protective switch 14 and if all conditions remain normal, the motor will continue to operate until the line switch 69 is opened. However, if some abnormal condition should occur, such as overloading and/or stalling of the motor, an additional amount of current will pass through bimetallic member 20 and resistor 19 of switch 14, and this additional current will cause resistor 19 to generate sufficient heat to flex bimetallic member 20 and thereby break line L1 and completely interrupt flow of current through the circuit.

After the circuit has been broken a sufficient time, bimetallic member 20 will move to again connect terminals 17, 18 but this will not re-establish the circuit since switch 15 has reset itself shortly after relay 36 has been energized, and therefore the time delay of switch 15 will become effective to delay starting of the motor for a predetermined time. The interruption and delayed starting of the motor will continue until the overload from the motor is removed. If the motor is stopped by normal opening of line switch 69, instead of by the automatic operation of thermal switch 14, subsequent starting of the motor by closing switch 69 will be accompanied by a time delay, as before.

In some instances the cycling between stopping and starting of the motor is undesirable, and in such cases the overload "Klixon" of the type shown in FIGURE 4 may be used in place of the overload switch 14. In this case, a reset button 70 must be manually closed before bimetallic member 20 will engage terminals 17 and 18. In all other respects, the switch operates as before described.

In view of the foregoing it will be apparent to those skilled in the art that I have accomplished at least the principal object of my invention and it will also be apparent to those skilled in the art that the embodiment herein described may be variously changed and modified, without departing from the spirit of the invention, and that the invention is capable of uses and has advantages not herein specifically described; hence it will be appreciated that the herein disclosed embodiment is illustrative only, and that my invention is not limited thereto.

I claim:

1. A control circuit for connecting a current consuming device to an electrical power system, comprising first and second control switches in said circuit, each having an electric heating element and a bimetallic contact-bridging member affected by its heating element, a relay coil and normally open and normally closed switches under control of said relay coil, said bimetallic members bridging their contacts to provide for flow of current in said system to energize the heating element of said first control switch and in a predetermined time deflect its bimetallic element to open its contacts and divert current flow to energize said relay coil and thereby change the positions of said normally open and closed switches and cause flow of operating current through said current consuming device, and the heating element of said second control switch being affected by an abnormal amount of current flow demanded by said current consuming device to provide sufficient heat to deflect its bimetallic member and interrupt current flow in said system.

2. The circuit according to claim 1 wherein said first control switch resets itself a predetermined time after its operation to establish flow of operating current to said current consuming device.

3. A control circuit for connecting the start and main windings of an electric motor to a power system, comprising first and second control switches each having an electric heating element and a bimetallic contact-bridging member affected by its heating element, a relay coil and normally open and normally closed switches under control of said relay coil, a centrifugal switch under control of the motor speed, and oil and electrolytic capacitors, said bimetallic members bridging their contacts when current is initially caused to flow to said circuit, the heating element of said first control switch heating its bimetallic member and flexing the latter after a predetermined interval of time to divert current flow to energize said relay coil and change the positions of said normally open and closed switches and provide for flow of current through the start and main windings of said motor and through said electrolytic capacitors to start rotation of said motor, said centrifugal switch being moved to open position when predetermined motor speed has been reached to place said start winding in series with said oil capacitors across a portion of said main winding, the heating element of said second control switch being affected by an abnormal amount of current demanded by said motor to generate enough heat to deflect its bimetallic element and interrupt flow of current in said circuit.

4. The circuit of claim 3 wherein said first control switch resets itself shortly after its operation to establish flow of operating current to said motor.

References Cited in the file of this patent
UNITED STATES PATENTS

| | | | |
|---|---|---|---|
| 2,262,869 | Vernott | | Nov. 18, 1941 |
| 2,338,515 | Johns | | Jan. 4, 1944 |
| 2,363,310 | Fritz | | Nov. 21, 1944 |
| 2,629,848 | Charlton | | Feb. 24, 1953 |